US012574852B2

(12) United States Patent
Arora

(10) Patent No.: US 12,574,852 B2
(45) Date of Patent: Mar. 10, 2026

(54) AUTO-RECOVERY DEVICE, METHOD, AND COMPUTER-READABLE MEDIUM

(71) Applicant: Rakuten Mobile, Inc., Tokyo (JP)

(72) Inventor: Vishal Arora, Tokyo (JP)

(73) Assignee: RAKUTEN MOBILE, INC., Tokyo (JP)

( * ) Notice: Subject to any disclaimer, the term of this patent is extended or adjusted under 35 U.S.C. 154(b) by 499 days.

(21) Appl. No.: 18/251,403

(22) PCT Filed: Jan. 13, 2023

(86) PCT No.: PCT/US2023/010774
§ 371 (c)(1),
(2) Date: May 2, 2023

(87) PCT Pub. No.: WO2024/151268
PCT Pub. Date: Jul. 18, 2024

(65) Prior Publication Data
US 2024/0357495 A1 Oct. 24, 2024

(51) Int. Cl.
*H04W 52/02* (2009.01)
(52) U.S. Cl.
CPC .............................. *H04W 52/0235* (2013.01)
(58) Field of Classification Search
CPC ............ H04W 52/0235; H04W 88/085; G06F 11/0736; G06F 11/0793; H04L 41/0654; H04L 41/0886; H04L 41/0895; H04L 41/0806; H04L 41/042
See application file for complete search history.

(56) References Cited

U.S. PATENT DOCUMENTS

| | | | | |
|---|---|---|---|---|
| 2020/0162348 A1* | 5/2020 | Suthar | .................. | H04L 41/5054 |
| 2021/0240490 A1* | 8/2021 | Chaiken | .............. | G06F 9/45558 |
| 2022/0231927 A1* | 7/2022 | Suthar | ................... | H04W 24/02 |
| 2022/0278788 A1* | 9/2022 | Pedersen | .............. | H04L 5/0035 |
| 2022/0322249 A1* | 10/2022 | Liu | ..................... | H04W 52/281 |
| 2022/0337926 A1* | 10/2022 | Liu | ...................... | G06F 3/0664 |
| 2022/0377834 A1* | 11/2022 | Peng | ................... | H04L 41/0853 |
| 2023/0156624 A1* | 5/2023 | Wang | .................. | H04W 52/346 455/522 |
| 2023/0164688 A1* | 5/2023 | Kumar | .................. | H04W 52/18 455/522 |
| 2023/0251942 A1* | 8/2023 | Rathinam | ........... | G06F 11/2025 714/4.11 |
| 2023/0336439 A1* | 10/2023 | Trujillo | ................. | H04L 45/586 |
| 2024/0214872 A1* | 6/2024 | Nakazato | .............. | H04W 28/18 |

(Continued)

FOREIGN PATENT DOCUMENTS

| | | | | | |
|---|---|---|---|---|---|
| CN | 119335985 A | * | 1/2025 | ......... | G05B 23/0221 |
| WO | WO-2025038919 A1 | * | 2/2025 | .......... | H04W 52/028 |

*Primary Examiner* — Wutchung Chu
(74) *Attorney, Agent, or Firm* — HAUPTMAN HAM, LLP

(57) ABSTRACT

A distributed unit (DU) includes a memory having non-transitory instructions stored therein and a processor coupled to the memory, and being configured to execute the instructions, thereby causing the DU to transmit a first power-on notification (PON) to an element management system (EMS), after transmitting the first PON, communicate with a first virtual centralized unit (vCU) using a stored first vCU fully qualified domain name (FQDN), and transmit a sequence of second PONs to the EMS in parallel with communicating with the vCU.

20 Claims, 9 Drawing Sheets

(56) References Cited

U.S. PATENT DOCUMENTS

| | | | |
|---|---|---|---|
| 2024/0224122 A1* | 7/2024 | Madan ................ | H04L 41/0806 |
| 2024/0365432 A1* | 10/2024 | Tamura ................ | H04W 76/30 |
| 2025/0133424 A1* | 4/2025 | Tamura ................ | H04W 24/04 |
| 2025/0294387 A1* | 9/2025 | Parichehrehteroujeni ................... | |
| | | | H04W 24/08 |

* cited by examiner

200

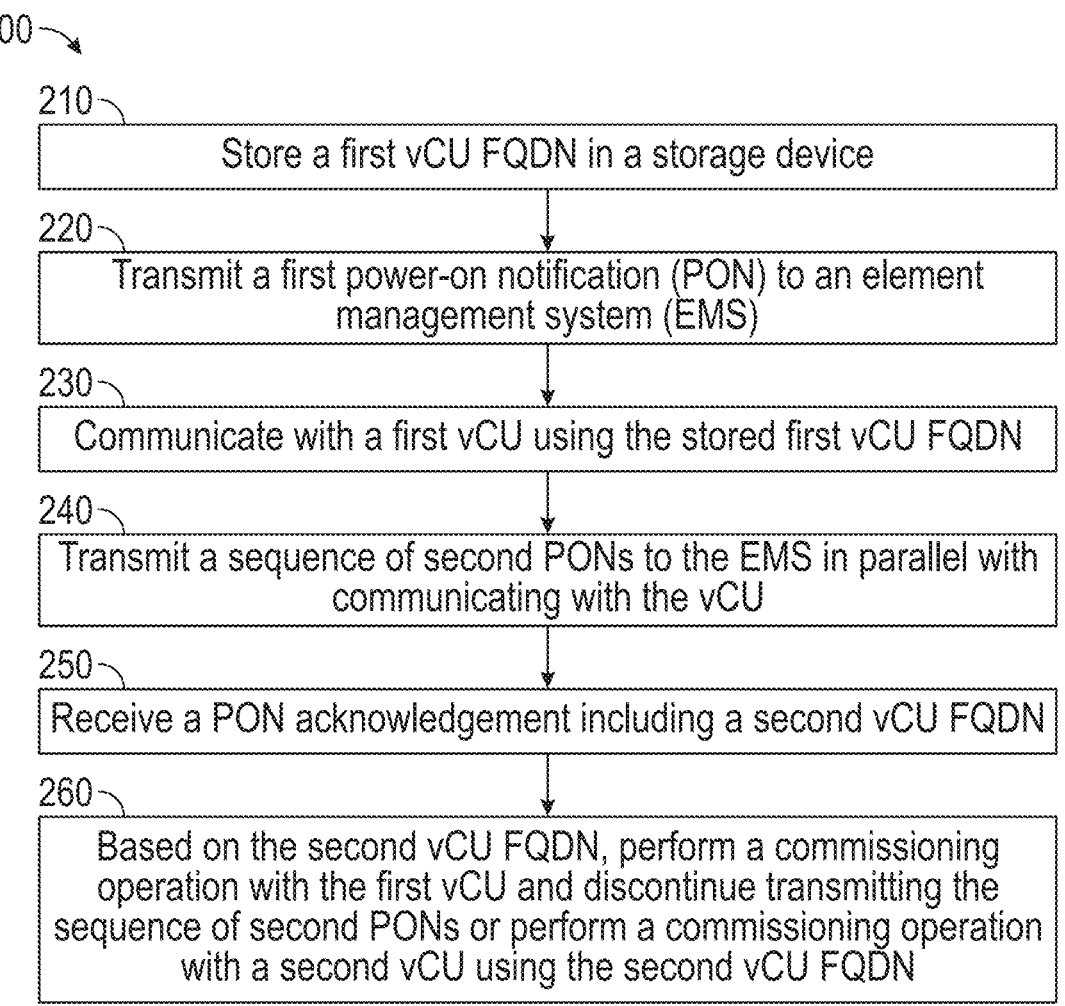

210
Store a first vCU FQDN in a storage device

220
Transmit a first power-on notification (PON) to an element management system (EMS)

230
Communicate with a first vCU using the stored first vCU FQDN

240
Transmit a sequence of second PONs to the EMS in parallel with communicating with the vCU 250
Receive a PON acknowledgement including a second vCU FQDN 260
Based on the second vCU FQDN, perform a commissioning operation with the first vCU and discontinue transmitting the sequence of second PONs or perform a commissioning operation with a second vCU using the second vCU FQDN

FIG. 2

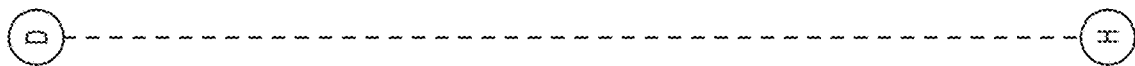

300B (D) - - - - - - - - - - - - - - - - - - - - - - - - - - - - - - - - - - - - - (H)

(C) - - - - - - - - - - - - - - - - - - - - - - - - - - - - - - - - - - - - - (G)

(A)    (B)

230 →

If PON ACK Not Received from EMS:

1st Retry of PON(N=1) is Sent After 5~10 Seconds(Randomly Reselected) + 60 secs

2nd Retry of PON(N=2) is Sent After 10~20 Seconds(Randomly Reselected) + 60 secs 3rd Retry of PON(N=3) is Sent After 20~40 Seconds(Randomly reselected) + 60 secs

- DU will Try to Connect to vCU Using Stored vCU FQDN if Exists After 3rd Retry and Continue 4th PON Retry. (DU Might Become Operational Using Stored vCU FQDN.)

4th Retry of PON(N=4) is Sent After 40~80 Seconds(randomly Reselected) + 60 Secs

...

7th Retry of PON(N=7) is Sent After 320~640 Seconds(Randomly Reselected) + 60 Secs 8th Retry of PON(N=7) is Sent After 320~640 Seconds(Randomly Reselected) + 60 Secs.

...

In General PON Retry Interval = 60 Secs + Random Seconds Between 5 x 2N-1 ~ 5 x 2N,
where N is for Nth Retry Limited to 7. (No Limit in PON Retry Numbers)

Above is Without DU Reboot.

*Port Open Time (Timeout to Wait PON ACK After Sending PON) : 60 Sec.

240 →

Alt / [PON ACK Timer Expiry]

Alt / [Expiry on 3rd Retry]

[11] Use Exising vCU FQDN

[12] Goto Step[23]

[13] Parallelly Send PON.
Back to Step[9]

⇑ Back to Step[9] to Send PON on PON ACK Timer Expiry

[14] http 204 OK (PON ACK)

AUTO-RECOVERY DEVICE, METHOD, AND COMPUTER-READABLE MEDIUM

RELATED APPLICATIONS

The present application is a National Phase of International Application No. PCT/US2023/010774, filed Jan. 13, 2023.

TECHNICAL FIELD

This description relates to a device, method, and non-transitory computer-readable medium directed to auto-recovery operations for telecommunication applications.

BACKGROUND

Telecommunication, e.g., cellular, systems include a large number of cells having a variety of sizes and signal strengths. A given cell corresponds to a base station that typically communicates with base stations of other cells through a radio access network (RAN), a mobile telecommunication system that implements a radio access technology (RAT). The RAN resides between devices such as mobile phones, computers, or other devices and, along with the base stations, provides connections through which these devices communicate with each other.

SUMMARY

In some embodiments, a distributed unit (DU) includes a memory having non-transitory instructions stored therein and a processor coupled to the memory, and being configured to execute the instructions, thereby causing the DU to transmit a first power-on notification (PON) to an element management system (EMS), after transmitting the first PON, communicate with a first virtual centralized unit (vCU) using a stored first vCU fully qualified domain name (FQDN), and transmit a sequence of second PONs to the EMS in parallel with communicating with the vCU.

In some embodiments, an auto-recovery method executed by a processor of a device includes transmitting a first PON to an EMS, after transmitting the first PON, communicating with a first vCU using a stored first vCU FQDN, and transmitting a sequence of second PONs to the EMS in parallel with communicating with the vCU.

In some embodiments, a computer-readable medium includes instructions executable by a controller of a device to cause the controller to perform operations including transmitting a first PON to an EMS, after transmitting the first PON, performing a commissioning operation with a first vCU using a stored first vCU FQDN, and transmitting a sequence of second PONs to the EMS in parallel with performing the commissioning operation with the vCU.

BRIEF DESCRIPTION OF DRAWINGS

Aspects of the present disclosure are best understood from the following detailed description when read with the accompanying figures. In accordance with the standard practice in the industry, various features are not drawn to scale. In fact, the dimensions of the various features are arbitrarily increased or reduced for clarity of discussion.

FIG. 2 is a flowchart of an auto-recovery method, in accordance with some embodiments.

FIGS. 3A-3F are flowcharts of an auto-recovery method, in accordance with some embodiments.

DETAILED DESCRIPTION

Figure 1:
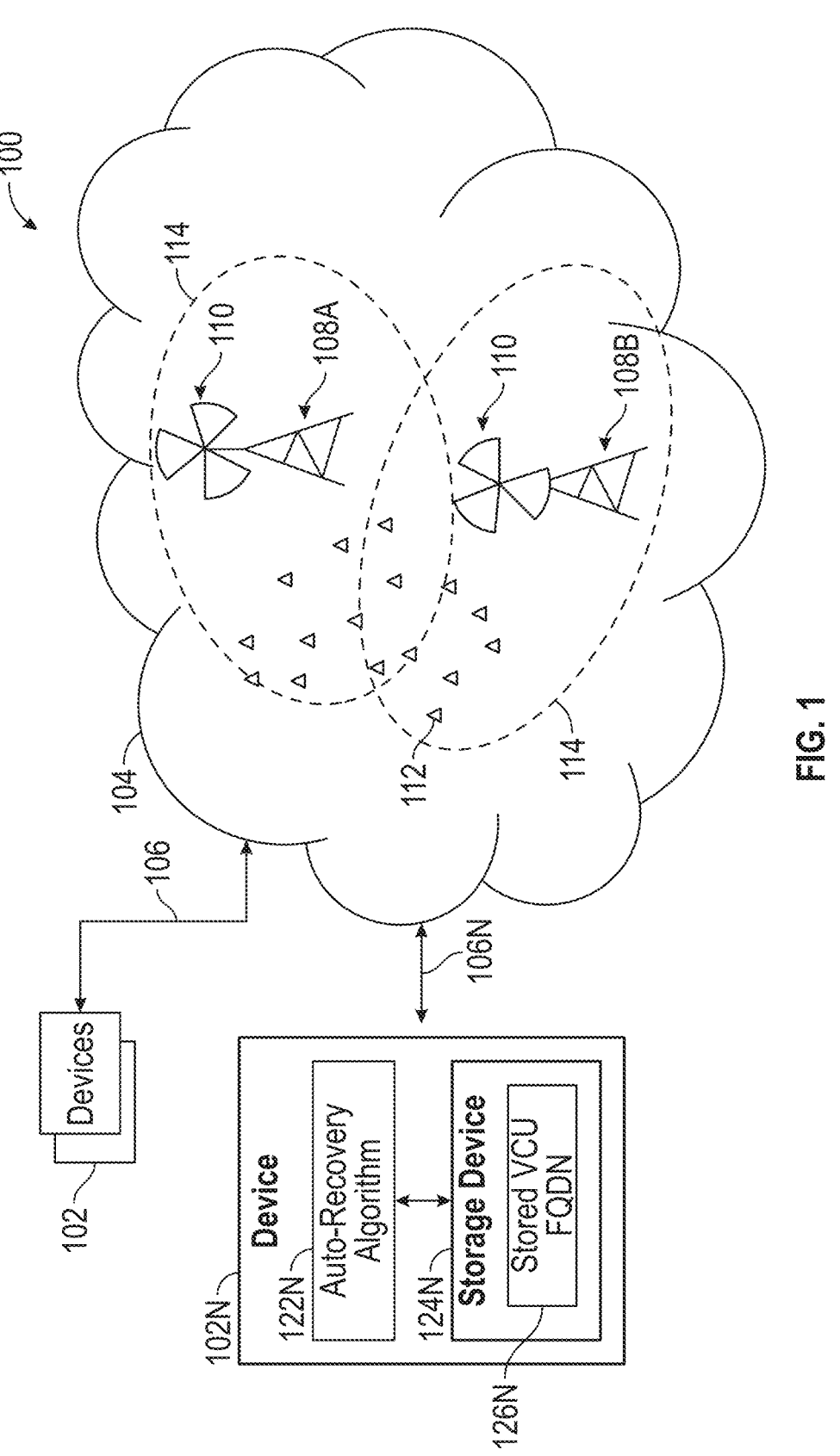
FIG. 1 is a diagram of a communication system, in accordance with some embodiments.
Figure 3A:
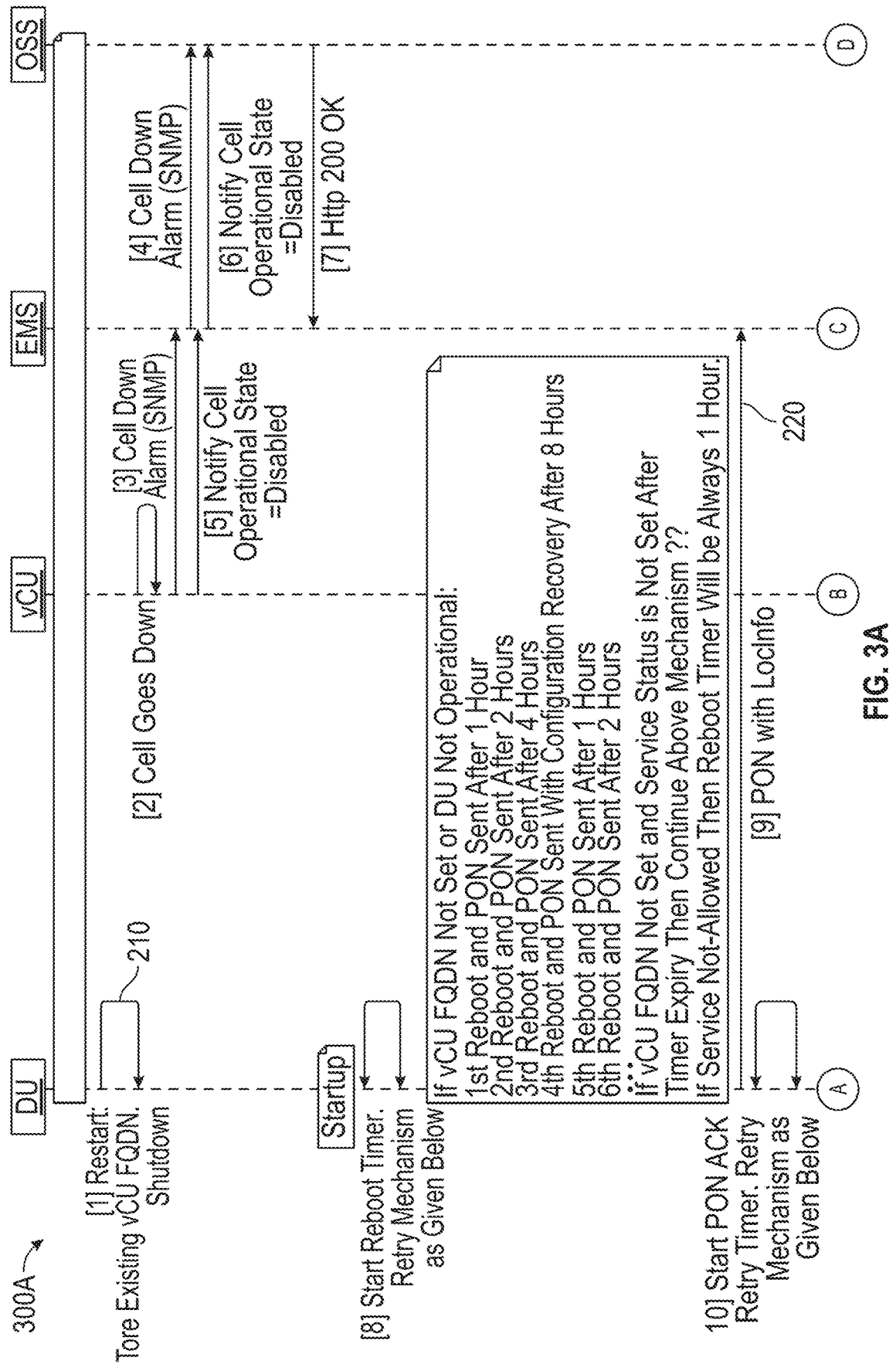
Figure 3C:
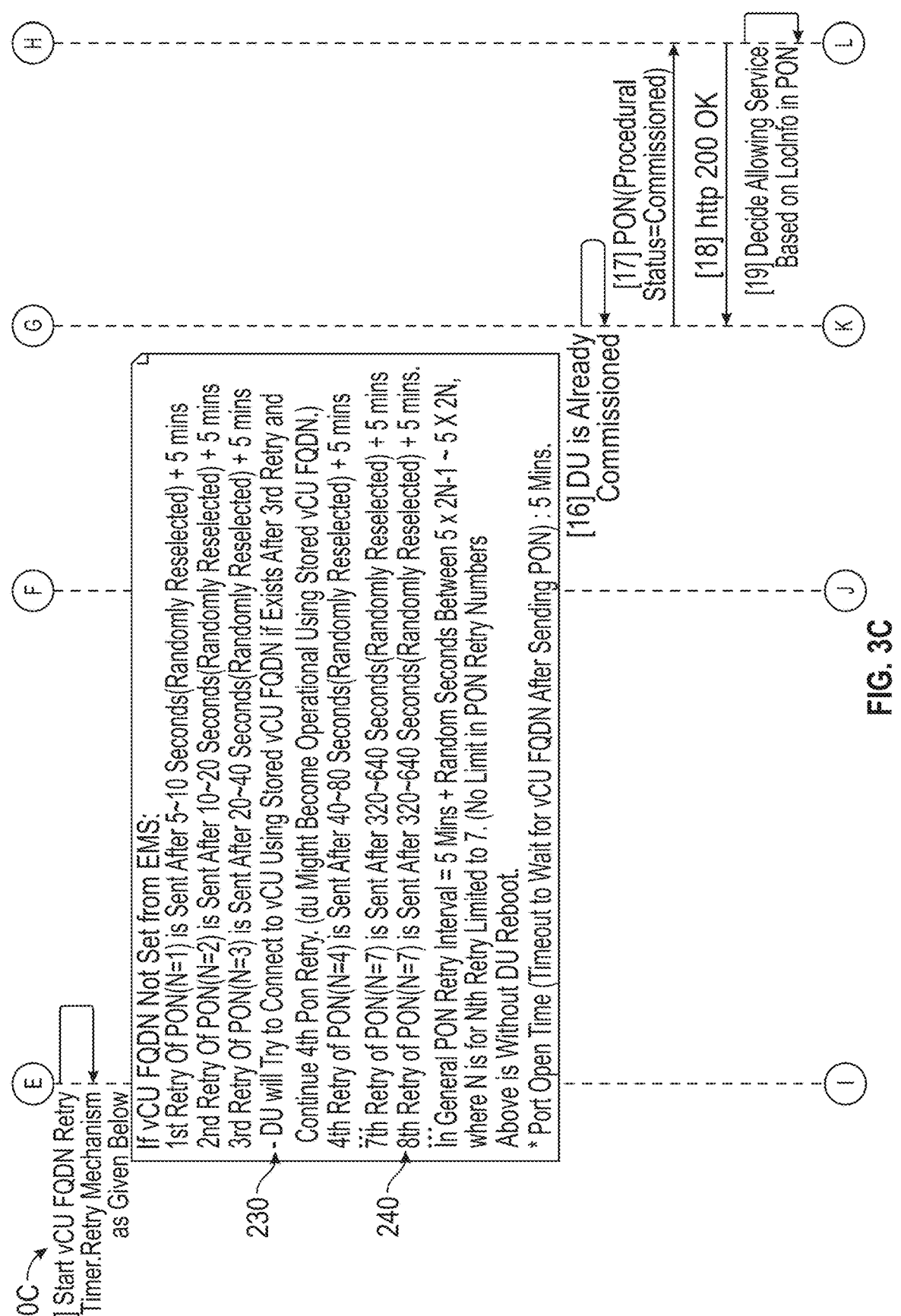
Figure 3D:
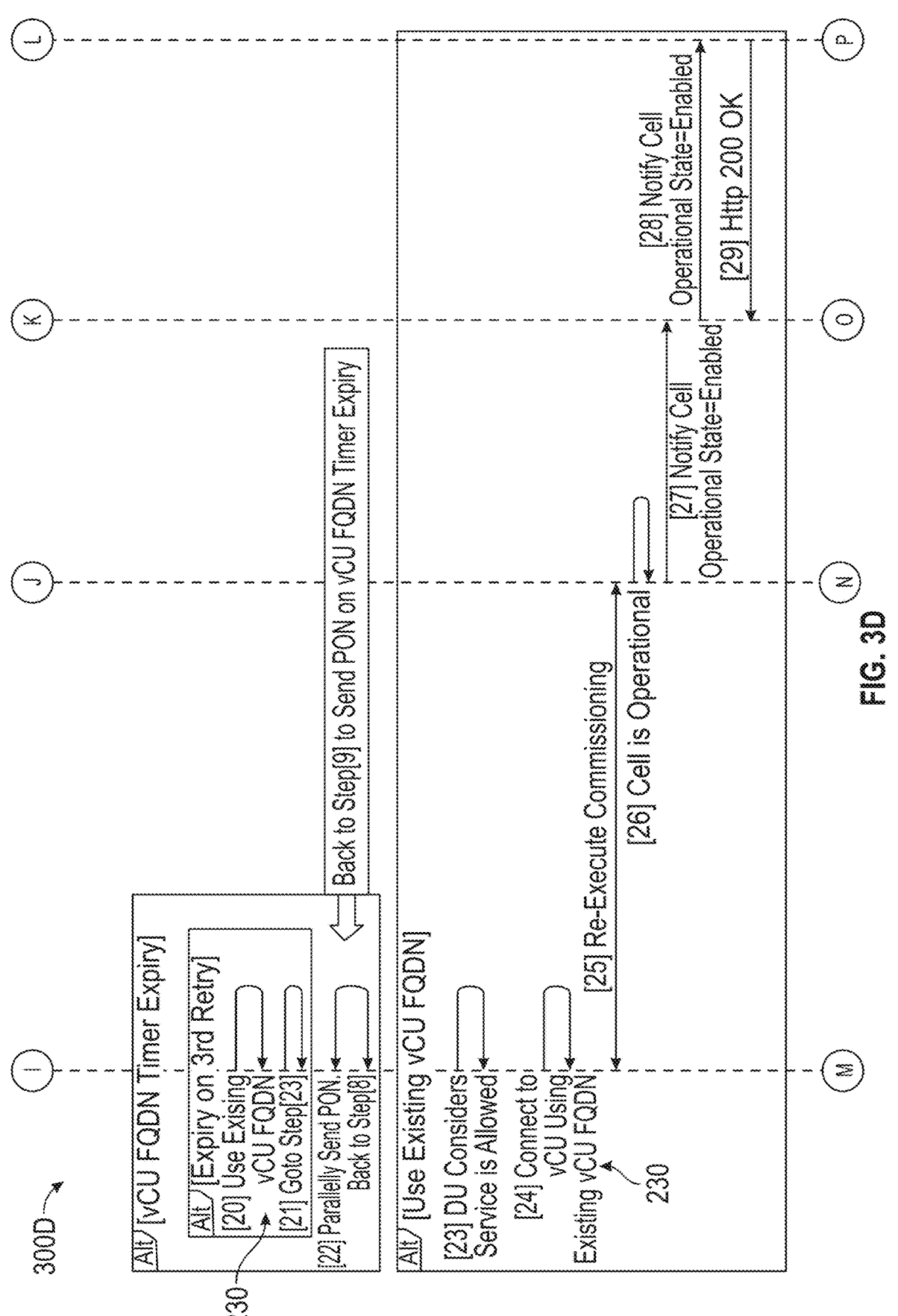
Figure 3E:
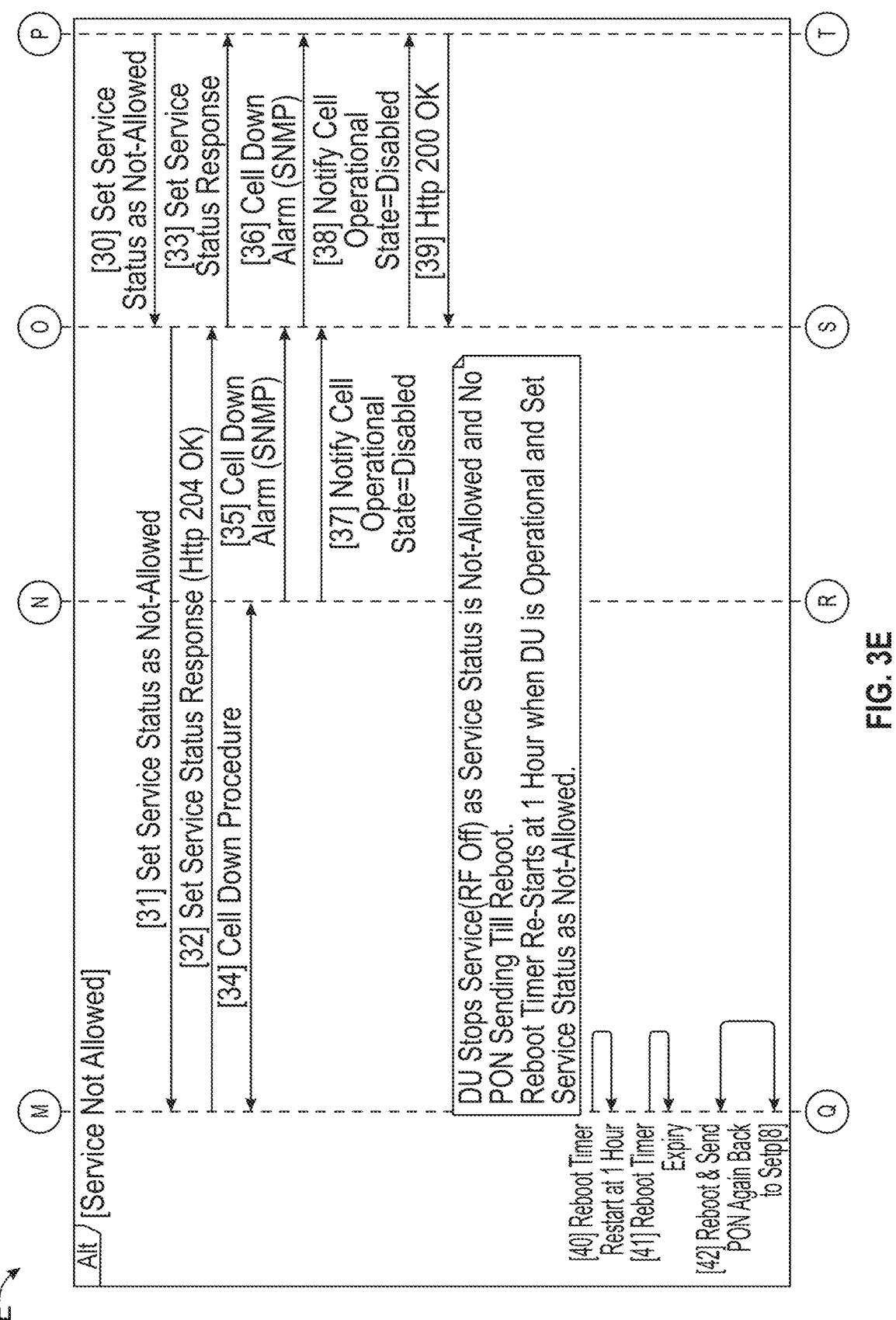
Figure 3F:
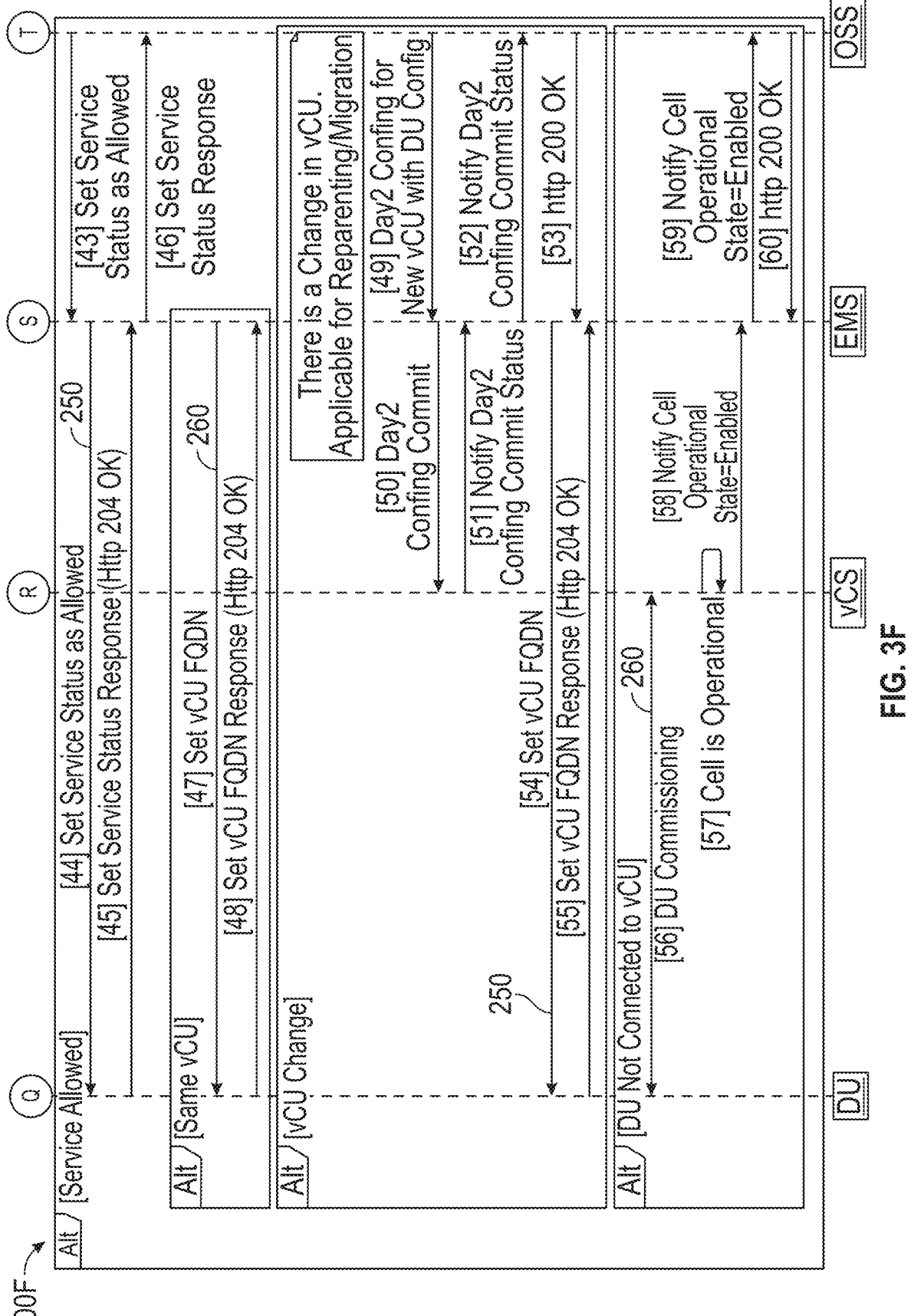

The following disclosure provides many different embodiments, or examples, for implementing different features of the provided subject matter. Specific examples of components and arrangements are described below to simplify the present disclosure. These are, of course, merely examples and are not intended to be limiting. For example, the formation or position of a first feature over or on a second feature in the description that follows include embodiments in which the first and second features are formed or positioned in direct contact and include embodiments in which additional features are formed or positioned between the first and second features, such that the first and second features are in indirect contact. In addition, the present disclosure repeats reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, are used herein for ease of description to describe one element or feature's relationship to another element(s) or feature(s) as illustrated in the figures. The spatially relative terms are intended to encompass different orientations of a system or object in use or operation in addition to the orientation depicted in the figures. The system is otherwise oriented (rotated 90 degrees or at other orientations) and the spatially relative descriptors used herein likewise are interpreted accordingly.

In various embodiments, some or all of a device, method, and computer readable medium are directed to using a distributed unit (DU) to transmit a first power-on notification (PON) to an element management system (EMS), after transmitting the first PON, communicate with a first virtual centralized unit (vCU), using a stored first vCU fully qualified domain name (FQDN), e.g., including performing a commissioning operation, and transmit a sequence of second PONs to the EMS in parallel with communicating with the vCU.

By communicating with the first vCU using the stored vCU FQDN while transmitting the sequence of second PONs to the EMS in parallel, the DU or other device is capable of providing services, e.g., cell-based communications, during periods in which the EMS is unable to provide a timely acknowledgement to a PON, e.g., following an internet service provider (ISP) disruption in which a large number of DUs and/or other devices are simultaneously transmitting PONs to the EMS. Compared to approaches in which a sequence of second PONs is not transmitted in parallel with communicating with a vCU using a stored vCU FQDN, the DU or other device is capable of restoring service levels more rapidly.

FIG. 1 is a diagram of a telecommunication system 100 (hereinafter referred to as "system 100"), in accordance with some embodiments. FIG. 1 is simplified for the purpose of illustration.

System 100 includes devices 102 coupled to a network 104 by links 106. Network 104 is coupled to a device 102N of devices 102 by a link 106N of links 106. Devices 102 including device 102N are coupled to each other through network 104 and links 106 including link 106N.

In some embodiments, devices 102 correspond to combinations of computing devices, computing systems, servers, server clusters, and/or pluralities of server clusters also referred to as server farms or data centers in some embodiments. In some embodiments, a device 500 discussed below with respect to FIG. 5 is an embodiment of a device 102.

In some embodiments, one or more of devices 102 is a type of mobile device, mobile terminal, fixed terminal, or portable terminal including a desktop computer, laptop computer, notebook computer, netbook computer, tablet computer, wearable circuitry, mobile handset, server, gaming console, or combination thereof. In some embodiments, one or more of devices 102 includes a display by which a user interface is displayed.

In some embodiments, one or more of devices 102 is a base station corresponding to one or more cells, e.g., a base station 108 corresponding to one or more cells 114, each discussed below. In some embodiments, one or more of devices 102 includes a distributed unit (DU), a centralized unit (CU), or a virtual CU (vCU). In some embodiments, a plurality of devices 102 are configured in accordance with a base station architecture including one or more instances of device 102 configured as a CU or VCU coupled with one or more instances of device 102 configured as a DU. Other configurations and/or types of devices 102 are within the scope of the present disclosure.

In the embodiment depicted in FIG. 1, device 102N includes an auto-recovery algorithm 122N and a storage device 124N configured to store auto-recovery information, e.g., a vCU FQDN 126N. In some embodiments, auto-recovery algorithm 122N is also referred to as vCU connection algorithm 122N or network connection algorithm 122N.

In the embodiment depicted in FIG. 1, device 102N including auto-recovery algorithm 122N is a single instance of plurality of devices 102. In some embodiments, device 102N including auto-recovery algorithm 122N includes more than one instance of plurality of devices 102. Auto-recovery algorithm 122N is further discussed below.

A storage device, e.g., storage device 124N, is one or more computer-readable, non-volatile storage devices, e.g., a database. In some embodiments, a storage device includes a memory 404 discussed below with respect to FIG. 4. In the embodiment depicted in FIG. 1, storage device 124N is located on device 102N. In some embodiments, storage device 124N is located externally to device 102N, e.g., on one or more servers accessed via link 106N.

Network 104 is one or more interconnected devices (not depicted individually) configured to provide electronic communications between and among the interconnected devices and plurality of devices 102, in some cases through plurality of links 106. In some embodiments, network 104 corresponds to the internet.

In some embodiments, network 104 includes or represents a radio access network (RAN), a mobile telecommunication system that implements a radio access technology (RAT) and resides between devices such as mobile phones, computers, or other devices and provides connection with plurality of devices 102.

In some embodiments, one or more of the interconnected devices of network 104 and/or plurality of devices 102 are configured as one or more of a local area network (LAN), a wide area network (WAN), a metropolitan area network (MAN), an internet area network (IAN), a campus area network (CAN), or a virtual private network (VPN). In some embodiments, one or more of the interconnected devices of network 104 and/or plurality of devices 102 are configured as a backbone (BB) or core network (CN), a part of a computer network that interconnects networks, providing a path for the exchange of information between different LANs, WANs, etc. In some embodiments, one or more of the interconnected devices of network 104 and/or plurality of devices 102 is configured as a backbone router (BBR), a device through which one or more networks external to a backbone or CN connects to and communicates with the backbone or CN.

In some embodiments, some of the interconnected devices of network 104 and/or devices 102 are configured as server clusters, e.g., included in a data center. In some embodiments, the server clusters are part of a cloud computing environment.

In the embodiment depicted in FIG. 1, network 104 includes base stations 108A and 108B (hereinafter base station 108), each including an antenna 110 wirelessly connected to one or more instances of user equipment (UE) 112 located in a geographic coverage area 114.

In some embodiments, network 104 is a global system for mobile communications (GSM) RAN, a GSM/EDGE RAN, a universal mobile telecommunications system (UMTS) RAN (UTRAN), an evolved universal terrestrial radio access network (E-UTRAN, open RAN (O-RAN), or cloud-RAN (C-RAN). In some embodiments, network 104 resides between a UE 112 (e.g., mobile phone, a computer, or any remotely controlled machine) and one or more core networks.

In some embodiments, network 104 is a hierarchical telecommunications network including one or more intermediate link(s), also referred to as backhaul portions in some embodiments, between a RAN and one or more core networks. Two common methods of mobile backhaul implementations are fiber-based backhaul and wireless point-to-point backhaul. Other methods, such as copper-based wireline, satellite communications and point-to-multipoint wireless technologies are being phased out as capacity and latency requirements become higher in 4G and 5G networks. Backhaul generally refers to the side of the network that communicates with the global internet. UEs 112 communicating with a base station 108 constitute a local subnetwork. In some embodiments, a backhaul includes wired, fiber optic, and/or wireless components including microwave bands and mesh and edge network topologies that use a high-capacity wireless channel to get packets to the microwave or fiber links.

In some embodiments, base stations 108 are lattice or self-supported towers, guyed towers, monopole towers, and concealed towers (e.g., towers designed to resemble trees, cacti, water towers, signs, light standards, and other types of structures). In some embodiments, a base station 108 is a cellular-enabled mobile device site where antennas and electronic communications equipment are placed, typically on a radio mast, tower, or other raised structure to create a cell (or adjacent cells) in a network. The raised structure typically supports antenna(s) 110 and one or more sets of transmitter/receivers, transceivers, digital signal processors, control electronics, a remote radio head (RRH), primary and backup electrical power sources, and sheltering. Base stations are known by other names such as base transceiver station, mobile phone mast, or cell tower. In some embodiments, base stations are edge devices configured to wirelessly communicate with UEs. The edge device provides an entry point into service provider core networks. Examples include routers, routing switches, integrated access devices (IADs), multiplexers, and a variety of MAN and WAN access devices.

In at least one embodiment, an instance of antenna 110 is a sector antenna, e.g., a directional microwave antenna with a sector-shaped radiation pattern, or a plurality of sector antennae, e.g., configured to have a full-circle coverage area 114. In some embodiments, an instance of antenna 110 is a circular antenna. In some embodiments, an instance of antenna 110 operates at microwave or ultra-high frequency (UHF) frequencies (300 Megahertz (MHz) to 3 Gigahertz (GHz)).

In various embodiments, a geographic coverage area 114, also referred to as a cell 114 in some embodiments, is a three-dimensional space having a shape and size based on the configurations of the corresponding base station 108, e.g., a power level, and antenna 110, e.g., a number of sectors. In various embodiments, a geographic coverage area 114 has a substantially spherical, hemispherical, conical, columnar, circular or oval disc, or other shape corresponding to a base station and antenna configuration. In various embodiments, one or both of the shape or size of a geographic coverage area 114 varies over time, e.g., based on a variable base station power level and/or a variable number of activated antennae and/or antenna sectors.

In some embodiments, a geographic coverage area 114 is referred to as a macro-cell, a micro-cell, a pico-cell, a femto-cell, or a small cell. In some embodiments, a coverage area 114 is referred to as an indoor small cell (IDSC).

Some or all instances of base station 108 are configured to transmit reference signals including at least one primary synchronization signal (PSS), at least one secondary synchronization signal (SSS), and additional physical channel signals. The physical channel signals include master information blocks (MIBs) and system information blocks (SIBs) that together include cell identifiers, tracking area codes, cell availability indicators (e.g., suitable, acceptable, reserved, barred, available to closed subscriber group only), service level indicators, time and/or frequency resource allocation indicators, and other information relevant to cell-based communications.

In some embodiments, an instance of base station 108, e.g., device 102N, is configured to enable more than one cell 114, e.g., corresponding to separate directions and/or frequency ranges. In some embodiments, an instance of base station 108 corresponds to a DU configured to communicate with a network, e.g., a RAN, through a gateway, e.g., a secure gateway or home gateway (HGW) using an instance of device 102 configured as a router. In some embodiments, the network includes a CU or VCU, and the instance of base station 108 is a DU configured to communicate with the CU or VCU through the gateway.

In some embodiments, an instance of UE 112 is a computer or computing system. In some embodiments, an instance of UE 112 has a liquid crystal display (LCD), light-emitting diode (LED) or organic light-emitting diode (OLED) screen interface, such as a graphical user interface providing a touchscreen interface with digital buttons and keyboard or physical buttons along with a physical keyboard. In some embodiments, an instance of UE 112 connects to the internet and interconnects with other devices. In some embodiments, an instance of UE 112 incorporates integrated cameras, the ability to place and receive voice and video telephone calls, video games, and Global Positioning System (GPS) capabilities. In some embodiments, an instance of UE 112 performs as a virtual machine or allows third-party apps to run as a container. In some embodiments, an instance of UE 112 is a computer (such as a tablet computer, netbook, digital media player, digital assistant, graphing calculator, handheld game console, handheld personal computer (PC), laptop, mobile internet device (MID), personal digital assistant (PDA), pocket calculator, portable medial player, or ultra-mobile PC), a mobile phone (such as a camera phone, feature phone, smartphone, or phablet), a digital camera (such as a digital camcorder, or digital still camera (DSC), digital video camera (DVC), or front-facing camera), a pager, a personal navigation device (PND), a wearable computer (such as a calculator watch, smartwatch, head-mounted display, earphones, or biometric device), or a smart card.

In some embodiments, a given instance of UE 112 corresponds to device 400 discussed below with respect to FIG. 4.

In some embodiments, a user of network 104, e.g., a user of a device 102, accesses network 104 through a service provider, a business or organization that sells bandwidth or network access by providing direct internet backbone access to internet service providers (ISPs) and usually access to its network access points (NAPs). Service providers are sometimes referred to as backbone providers or internet providers. Service providers consist of telecommunications companies, data carriers, wireless communications providers, ISPs, and cable television operators offering high-speed internet access.

Links 106 include hardware configured to enable electronic communications between devices 102 and network 104. In various embodiments, one or more of links 106 is a wired link, e.g., fiber optic, shielded, twisted pair, or other cabling, or a wireless link type.

In various embodiments, one or more of links 106 is configured to communicate based on code division multiple access (CDMA), wideband CDMA (WCDMA), time division multiple access (TDMA), frequency division multiple access (FDMA), Orthogonal Frequency Division Multiplexing (OFDM), time division duplexing (TDD), frequency division duplexing (FDD), Bluetooth, Infrared (IR), or the like, or other protocols that may be used in a wired or wireless data communications network. Accordingly, the exemplary illustrations provided herein are not intended to limit the embodiments of the disclosure and are merely to aid in the description of aspects of the embodiments of the disclosure.

Network 104 includes one or more devices (not shown in FIG. 1) configured as an element management system (EMS) configured to communicate with and thereby manage the various network elements, and one or more devices (not shown in FIG. 1) configured as an operations support system (OSS) configured to communicate with and support the EMS.

Auto-recovery algorithm 122N is one or more sets of instructions configured to be executed on device 102N, e.g., stored in storage device 124N, whereby device 102N performs an auto-recovery operation in accordance with an auto-recovery method 200 discussed below with respect to FIG. 2. In some embodiments, auto-recovery algorithm 122N is configured to run as a standalone program or within one or more sets of instructions. In some embodiments, auto-recovery algorithm 122N is configured to run on one or more of devices 102 in addition to device 102N.

In some embodiments, auto-recovery algorithm 122N is configured to be included in, or to include, an automated network connection sequence, e.g., a plug-play (PnP) procedure and/or power-on sequence. In some embodiments, auto-recovery algorithm 122N is configured to be executed on device 102N configured as a small cell base station, e.g., a femtocell base station also referred to as a femto device in some embodiments. In some embodiments, auto-recovery algorithm 122N is configured to run as a standalone program or within one or more sets of instructions.

Device 102N is configured to perform operations, e.g., PnP operations, corresponding to one or both of internet protocol version 4 (IPv4) and internet protocol version 6 (IPv6). Device 102N including auto-recovery algorithm 122N is thereby configured to execute gateway or other connection activities in accordance with auto-recovery method 200 discussed below, whereby device 102N stores a first vCU FQDN in storage device 124N in some embodiments, transmits a first power-on notification (PON) to an EMS, after transmitting the first PON, communicates with a first vCU using the stored first vCU FQDN, e.g., including performing a commissioning operation, and transmits a sequence of second PONs to the EMS in parallel with communicating with the vCU.

By communicating with the first vCU using the stored vCU FQDN while transmitting the sequence of second PONs to the EMS in parallel, device 102N is capable of providing services, e.g., cell-based communications, during periods in which the EMS is unable to provide a timely acknowledgement to a PON, e.g., following an ISP disruption in which a large number of DUs and/or other devices are simultaneously transmitting PONs to the EMS. Compared to approaches in which a sequence of second PONs is not transmitted in parallel with communicating with a vCU using a stored vCU FQDN, device 102N is thereby capable of restoring service levels more rapidly.

FIG. 2 is a flowchart of auto-recovery method 200, in accordance with some embodiments. Auto-recovery method 200, also referred to as method 200 in some embodiments, is operable on a DU or other device of a telecommunication system, e.g., device 102N of system 100 discussed above with respect to FIG. 1.

Additional operations may be performed before, during, between, and/or after the operations of method 200 depicted in FIG. 2, and some other operations may only be briefly described herein. In some embodiments, other orders of operations of method 200 are within the scope of the present disclosure. In some embodiments, one or more operations of method 200 are not performed. In some embodiments, the operations of method 200 are included in another method, e.g., a method of performing a PnP and/or power-on sequence.

In some embodiments, some or all of the operations of method 200 discussed below are capable of being performed automatically, e.g., by network device 102N including auto-recovery algorithm 122N, discussed above with respect to FIG. 1 and/or by using processing circuitry 402 to execute an auto-recovery algorithm 416, each discussed below with respect to FIG. 4.

The operations of method 200 are discussed below with reference to various features of system 100 that are also discussed above with respect to FIG. 1.

FIG. 3 depicts a non-limiting example that illustrates the execution of some or all of the operations of method 200 using an embodiment of system 100 and device 102N, as further discussed below.

At operation 210, in some embodiments, a device stores a first vCU FQDN in a storage device. In some embodiments, the device storing the first vCU FQDN in the storage device includes device 102N storing vCU FQDN 126N in storage device 124N.

In some embodiments, the device stores the first vCU FQDN in the storage device during or after performing a commissioning operation with a first vCU using the first vCU FQDN.

At operation 220, in some embodiments, the device transmits a first PON to an EMS. In some embodiments, the device transmitting the first PON to the EMS includes device 102N transmitting the first PON to the EMS.

In some embodiments, the first PON is one first PON of a sequence of first PONs, and transmitting the first PON to the EMS comprises transmitting the sequence of first PONs to the EMS. In some embodiments, transmitting the sequence of first PONs to the EMS includes transmitting successive first PONs of the sequence of first PONs separated by retry intervals.

At operation 230, in some embodiments, the device communicates with the first vCU using the stored first vCU FQDN. In some embodiments, the device communicating with the first vCU using the stored first vCU FQDN includes device 102N communicating with the first vCU using the stored vCU FQDN 126N.

In some embodiments, the device communicating with the first vCU using the stored first vCU FQDN includes the device performing a commissioning operation with the first vCU using the stored first vCU FQDN.

At operation 240, in some embodiments, the device transmits a sequence of second PONs to the EMS in parallel with communicating with the vCU. In some embodiments, the device transmitting the sequence of second PONs includes device 102N transmitting the sequence of second PONs to the EMS in parallel with communicating with the vCU.

In some embodiments, the device transmitting the sequence of second PONs includes the device transmitting successive second PONs of the sequence of second PONs separated by retry intervals. In some embodiments, the device transmitting the sequence of second PONs includes the device terminating transmitting the sequence of second PONs after a predetermined time interval has elapsed.

At operation 250, in some embodiments, the device receives a PON acknowledgement including a second vCU FQDN. In some embodiments, the device receiving the PON acknowledgement includes device 102N receiving the PON acknowledgement. In some embodiments, the device receiving the PON acknowledgement includes the device receiving the PON acknowledgement from the EMS.

In various embodiments, the device receiving the PON acknowledgement including the second vCU FQDN includes the second vCU FQDN matching the first vCU FQDN or being different from the first vCU FQDN, e.g., based on a reparenting or movement of the vCU relative to the device.

At operation 260, in some embodiments, the device, based on the second vCU FQDN, either performs a commissioning operation with the first vCU and discontinues transmitting the sequence of second PONs, or performs a commissioning operation with a second vCU using the second vCU FQDN. In some embodiments, the device performing the commissioning operation includes device 102N performing the commissioning operation.

In some embodiments, the device performs the commissioning operation with the first vCU and discontinues transmitting the sequence of second PONs in response to receiving the second vCU FQDN matching the first vCU FQDN. In some embodiments, the device performs the commissioning operation with the second vCU in response to receiving the second vCU FQDN different from the first vCU FQDN.

By performing some or all of the operations of method 200, a device, e.g., device 102N, automatically transmits a first PON to an EMS, after transmitting the first PON, communicates with a first vCU using a stored first vCU FQDN, e.g., including performing a commissioning operation, and transmits a sequence of second PONs to the EMS in parallel with communicating with the vCU, thereby achieving the benefits discussed above with respect to device 102N and system 100.

FIGS. 3A-3F are flowcharts of an auto-recovery method 300, in accordance with some embodiments. Method 300 depicted in FIGS. 3A-3F as corresponding portions 300A-300F is a non-limiting example of method 200 including operations 210-260 discussed above and is simplified for the purpose of illustration.

In the example depicted in FIGS. 3A-3F, method 300 corresponds to operations included in a power-on sequence including plug-play (PnP) operations. FIGS. 3A-3F depict non-limiting examples of a DU corresponding to device 102N, a vCU, an EMS and an OSS, each discussed above.

In method 300, each of operations 210-260 is included in one or more portions of an auto-recovery method performed by multiple elements of a system, e.g., system 100 discussed above. The non-limiting examples of operations 210-260 depicted in FIGS. 3A-3F correspond to the operations of method 200 performed by the non-limiting example of device 102N (DU) in the context of the system-level auto-recovery operation.

By including the non-limiting examples of operations 210-260, method 300 is capable of realizing the benefits of method 200 discussed above.

Figure 4:
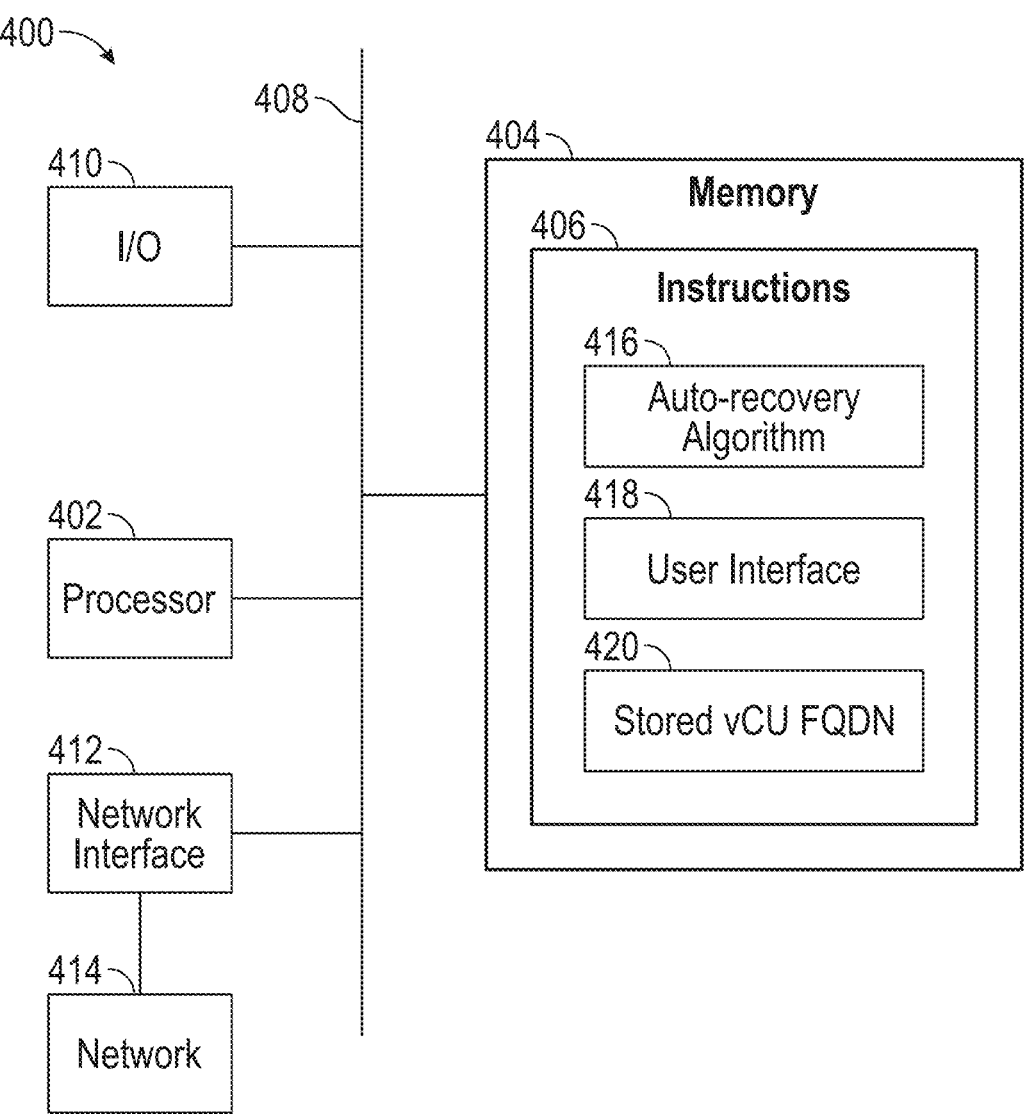
FIG. 4 is a diagram of a processor-based device, in accordance with some embodiments.

FIG. 4 is a functional block diagram of a computer or processor-based device 400 upon which or by which an embodiment is implemented.

Processor-based device 400 is programmed to facilitate automated gateway connections as described herein, and includes, for example, bus 408, processing circuitry 402, also referred to a processor 402 in some embodiments, and memory 404 components.

In some embodiments, processor-based device 400 includes a communication mechanism such as bus 408 for transferring information and/or instructions among the components of processor-based device 400. Processing circuitry 402 is connected to bus 408 to obtain instructions for execution and process information stored in, for example, memory 404. In some embodiments, processing circuitry 402 is also accompanied with one or more specialized components to perform certain processing functions and tasks such as one or more digital signal processors (DSP), or one or more application-specific integrated circuits (ASIC). A DSP typically is configured to process real-world signals (e.g., sound) in real time independently of processing circuitry 402. Similarly, an ASIC is configurable to perform specialized functions not easily performed by a more general-purpose processor. Other specialized components to aid in performing the functions described herein optionally include one or more field programmable gate arrays (FPGA), one or more controllers, or one or more other special-purpose computer chips.

In one or more embodiments, processing circuitry (or multiple processors) 402 performs a set of operations on information as specified by a set of instructions stored in memory 404 related to network connection operations, e.g., auto-recovery algorithm 416 corresponding to auto-recovery algorithm 122N discussed above with respect to FIGS. 1-3F. The execution of the instructions causes the processor to perform specified functions.

Processing circuitry 402 and accompanying components are connected to memory 404 via bus 408. Memory 404 includes one or more of dynamic memory (e.g., RAM, magnetic disk, writable optical disk, or the like) and static memory (e.g., ROM, CD-ROM, or the like) for storing executable instructions that when executed perform the operations described herein to facilitate automated network configuration. In some embodiments, memory 404 also stores the data associated with or generated by the execution of the operations, e.g., stored vCU FQDN 420 corresponding to stored vCU FQDN 126N discussed above with respect to FIG. 1.

In one or more embodiments, memory 404, such as a random-access memory (RAM) or any other dynamic storage device, stores information including processor instructions for facilitating network application implementation. Dynamic memory allows information stored therein to be changed. RAM allows a unit of information stored at a location called a memory address to be stored and retrieved independently of information at neighboring addresses. Memory 404 is also used by processing circuitry 402 to store temporary values during execution of processor instructions. In various embodiments, memory 404 includes a read only memory (ROM) or any other static storage device coupled to bus 408 for storing static information, including instructions, that is not capable of being changed by processing circuitry 402. Some memory is composed of volatile storage that loses the information stored thereon when power is lost. In some embodiments, memory 404 includes a non-volatile (persistent) storage device, such as a magnetic disk, optical disk, or flash card, for storing information, including instructions, that persists even when device 400 is turned off or otherwise loses power.

The term "computer-readable medium" as used herein refers to any medium that participates in providing information to processing circuitry 402, including instructions 406 for execution. Such a medium takes many forms, including, but not limited to computer-readable storage medium (e.g., non-volatile media, volatile media). Non-volatile media includes, for example, optical or magnetic disks. Volatile media include, for example, dynamic memory. Common forms of computer-readable media include, for example, a floppy disk, a flexible disk, a hard disk, a magnetic tape, another magnetic medium, a CD-ROM, CDRW, DVD, another optical medium, punch cards, paper tape, optical mark sheets, another physical medium with patterns of holes or other optically recognizable indicia, a RAM, a PROM, an EPROM, a FLASH-EPROM, an EEPROM, a flash memory, another memory chip or cartridge, or another medium from which a computer reads. The term computer-readable storage medium is used herein to refer to a computer-readable medium.

Instructions 406 also include a user interface 418, one or more sets of instructions configured to allow effective operation and control of device 400 by a user. In some embodiments, user interface 418 is configured to operate though one or more layers, including a human-machine interface (HMI) that interfaces machines with physical input hardware such as keyboards, mice, or game pads, and output hardware such as computer monitors, speakers, printers, and other suitable user interfaces.

In some embodiments, a DU includes a memory having non-transitory instructions stored therein and a processor coupled to the memory, and being configured to execute the instructions, thereby causing the DU to transmit a first PON to an EMS, after transmitting the first PON, communicate with a first vCU using a stored first vCU FQDN, and transmit a sequence of second PONs to the EMS in parallel with communicating with the vCU. In some embodiments, the instructions are executable by the processor to cause the DU to, prior to transmitting the first PON, store the first vCU FQDN during or after performing a commissioning operation using the first vCU FQDN. In some embodiments, the instructions are executable by the processor to cause the DU to communicate with the vCU using the stored first vCU FQDN as part of performing a commissioning operation. In some embodiments, the instructions are executable by the processor to cause the DU to receive a PON acknowledgement including the first vCU FQDN, and in response to receiving the PON acknowledgement, perform a commissioning operation with the first vCU using the first vCU FQDN and discontinue transmitting the sequence of second PONs to the EMS. In some embodiments, the instructions are executable by the processor to cause the DU to receive a PON acknowledgement including a second vCU FQDN different from the first vCU FQDN, and in response to receiving the second vCU FQDN, perform a commissioning operation with a second vCU using the second vCU FQDN. In some embodiments, the first PON is one first PON of a sequence of first PONs, and the instructions are executable by the processor to cause the DU to communicate with the first vCU using the stored first vCU FQDN after transmitting the sequence of first PONs to the EMS. In some embodiments, the instructions are executable by the processor to cause the DU to transmit successive second PONs of the sequence of second PONs separated by retry intervals.

In some embodiments, an auto-recovery method executed by a processor of a device includes transmitting a first PON to an EMS, after transmitting the first PON, communicating with a first vCU using a stored first vCU FQDN, and transmitting a sequence of second PONs to the EMS in parallel with communicating with the vCU. In some embodiments, prior to the transmitting the first PON, storing the first vCU FQDN during or after performing a commissioning operation using the first vCU FQDN. In some embodiments, communicating with the vCU using the stored first vCU FQDN includes performing a commissioning operation. In some embodiments, the method includes receiving a PON acknowledgement including the first vCU FQDN, and in response to the receiving the PON acknowledgement, performing a commissioning operation with the first vCU using the first vCU FQDN and discontinuing the transmitting the sequence of second PONs to the EMS. In some embodiments, the method includes receiving a PON acknowledgement including a second vCU FQDN different from the first vCU FQDN, and in response to receiving the second vCU FQDN, performing a commissioning operation with a second vCU using the second vCU FQDN. In some embodiments, the first PON is one first PON of a sequence of first PONs, and transmitting the first PON to the EMS includes transmitting the sequence of first PONs to the EMS. In some embodiments, transmitting the sequence of second PONs includes transmitting successive second PONs of the sequence of second PONs separated by retry intervals.

In some embodiments, a computer-readable medium includes instructions executable by a controller of a device to cause the controller to perform operations including transmitting a first PON to an EMS, after transmitting the first PON, performing a commissioning operation with a first vCU using a stored first vCU FQDN, and transmitting a sequence of second PONs to the EMS in parallel with the performing the commissioning operation with the vCU. In some embodiments, the instructions are executable by the controller of the device to further cause the controller to, prior to transmitting the first PON, store the first vCU FQDN during or after performing a commissioning operation using the first vCU FQDN. In some embodiments, the instructions are executable by the controller of the device to further cause the controller to receive a PON acknowledgement including the first vCU FQDN, and in response to receiving the PON acknowledgement, perform a commissioning operation with the first vCU using the first vCU FQDN and discontinue transmitting the sequence of second PONs to the EMS. In some embodiments, the instructions are executable by the controller of the device to further cause the controller to receive a PON acknowledgement including a second vCU FQDN different from the first vCU FQDN, and in response to receiving the second vCU FQDN, perform a commissioning operation with a second vCU using the second vCU FQDN. In some embodiments, the first PON is one first PON of a sequence of first PONs, and the instructions are executable by the controller of the device to further cause the controller to transmit the first PON to the EMS as part of transmitting the sequence of first PONs to the EMS prior to performing the commissioning operation with the first vCU. In some embodiments, the instructions are executable by the controller of the device to cause the controller to transmit the sequence of second PONs by transmitting successive second PONs of the sequence of second PONs separated by retry intervals.

The foregoing outlines features of several embodiments so that those skilled in the art better understand the aspects of the present disclosure. Those skilled in the art appreciate that they readily use the present disclosure as a basis for designing or modifying other processes and structures for carrying out the same purposes and/or achieving the same advantages of the embodiments introduced herein. Those skilled in the art also realize that such equivalent constructions do not depart from the spirit and scope of the present disclosure, and that they make various changes, substitutions, and alterations herein without departing from the spirit and scope of the present disclosure.

What is claimed is:

1. A distributed unit (DU) comprising:
   a memory having non-transitory instructions stored therein; and
   a processor coupled to the memory, and being configured to execute the instructions, thereby causing the DU to:
      transmit a first power-on notification (PON) to an element management system (EMS);
      after transmitting the first PON, communicate with a first virtual centralized unit (vCU) using a stored first vCU fully qualified domain name (FQDN); and
      transmit a sequence of second PONs to the EMS in parallel with communicating with the vCU.

2. The DU of claim 1, wherein the instructions are executable by the processor to cause the DU to, prior to transmitting the first PON, store the first vCU FQDN during or after performing a commissioning operation using the first vCU FQDN.

3. The DU of claim 1, wherein the instructions are executable by the processor to cause the DU to communicate with the vCU using the stored first vCU FQDN as part of performing a commissioning operation.

4. The DU of claim 1, wherein the instructions are executable by the processor to cause the DU to:
   receive a PON acknowledgement comprising the first vCU FQDN; and
   in response to receiving the PON acknowledgement, perform a commissioning operation with the first vCU using the first vCU FQDN and discontinue transmitting the sequence of second PONs to the EMS.

5. The DU of claim 1, wherein the instructions are executable by the processor to cause the DU to:

receive a PON acknowledgement comprising a second vCU FQDN different from the first vCU FQDN; and in response to receiving the second vCU FQDN, perform a commissioning operation with a second vCU using the second vCU FQDN.

6. The DU of claim 1, wherein the first PON is one first PON of a sequence of first PONs, and the instructions are executable by the processor to cause the DU to communicate with the first vCU using the stored first vCU FQDN after transmitting the sequence of first PONs to the EMS.

7. The DU of claim 1, wherein the instructions are executable by the processor to cause the DU to transmit successive second PONs of the sequence of second PONs separated by retry intervals.

8. An auto-recovery method executed by a processor of a device, the method comprising:

transmitting a first power-on notification (PON) to an element management system (EMS);

after transmitting the first PON, communicating with a first virtual centralized unit (vCU) using a stored first vCU fully qualified domain name (FQDN); and transmitting a sequence of second PONs to the EMS in parallel with communicating with the vCU.

9. The method of claim 8, further comprising:

prior to the transmitting the first PON, storing the first vCU FQDN during or after performing a commissioning operation using the first vCU FQDN.

10. The method of claim 8, wherein the communicating with the vCU using the stored first vCU FQDN comprises performing a commissioning operation.

11. The method of claim 8, further comprising:

receiving a PON acknowledgement comprising the first vCU FQDN; and in response to the receiving the PON acknowledgement, performing a commissioning operation with the first vCU using the first vCU FQDN and discontinuing the transmitting the sequence of second PONs to the EMS.

12. The method of claim 8, further comprising:

receiving a PON acknowledgement comprising a second vCU FQDN different from the first vCU FQDN; and in response to the receiving the second vCU FQDN, performing a commissioning operation with a second vCU using the second vCU FQDN.

13. The method of claim 8, wherein the first PON is one first PON of a sequence of first PONs, and the transmitting the first PON to the EMS comprises transmitting the sequence of first PONs to the EMS.

14. The method of claim 8, wherein the transmitting the sequence of second PONs comprises transmitting successive second PONs of the sequence of second PONs separated by retry intervals.

15. A computer-readable medium including instructions executable by a controller of a device to cause the controller to perform operations comprising:

transmitting a first power-on notification (PON) to an element management system (EMS);

after transmitting the first PON, performing a commissioning operation with a first virtual centralized unit (vCU) using a stored first vCU fully qualified domain name (FQDN); and transmitting a sequence of second PONs to the EMS in parallel with the performing the commissioning operation with the vCU.

16. The computer-readable medium of claim 15, wherein the instructions are executable by the controller of the device to further cause the controller to:

prior to transmitting the first PON, store the first vCU FQDN during or after performing a commissioning operation using the first vCU FQDN.

17. The computer-readable medium of claim 15, wherein the instructions are executable by the controller of the device to further cause the controller to:

receive a PON acknowledgement comprising the first vCU FQDN; and in response to receiving the PON acknowledgement, perform a commissioning operation with the first vCU using the first vCU FQDN and discontinue transmitting the sequence of second PONs to the EMS.

18. The computer-readable medium of claim 15, wherein the instructions are executable by the controller of the device to further cause the controller to:

receive a PON acknowledgement comprising a second vCU FQDN different from the first vCU FQDN; and in response to receiving the second vCU FQDN, perform a commissioning operation with a second vCU using the second vCU FQDN.

19. The computer-readable medium of claim 15, wherein the first PON is one first PON of a sequence of first PONs, and the instructions are executable by the controller of the device to further cause the controller to transmit the first PON to the EMS as part of transmitting the sequence of first PONs to the EMS prior to performing the commissioning operation with the first vCU.

20. The computer-readable medium of claim 15, wherein the instructions are executable by the controller of the device to cause the controller to transmit the sequence of second PONs by transmitting successive second PONs of the sequence of second PONs separated by retry intervals.

* * * * *